(No Model.)  2 Sheets—Sheet 1.

T. P. POLLARD.
NUT LOCK.

No. 447,697.   Patented Mar. 3, 1891.

Witnesses:
Edward T. Fenwick
J. P. Theo Lang

Inventor:
Thomas P. Pollard
by his attys.
Mason, Fenwick & Lawrence (No Model.) 2 Sheets—Sheet 2.

T. P. POLLARD.
NUT LOCK.

No. 447,697. Patented Mar. 3, 1891.

Witnesses:
J. P. Theo Lang.
E. J. Fenwick

Inventor:
Thomas P. Pollard
by his atty
Mason, Fenwick Lawrence

UNITED STATES PATENT OFFICE.

THOMAS POINDEXTER POLLARD, OF RICHMOND, VIRGINIA.

NUT-LOCK.

SPECIFICATION forming part of Letters Patent No. 447,697, dated March 3, 1891.

Application filed May 21, 1890. Serial No. 352,585. (No model.)

*To all whom it may concern:*

Be it known that I, THOMAS POINDEXTER POLLARD, a citizen of the United States, residing at Richmond, in the county of Henrico and State of Virginia, have invented certain new and useful Improvements in Nut-Locks; and I do hereby declare the following to be a full, clear, and exact description of the invention, such as will enable others skilled in the art to which it appertains to make and use the same.

My invention relates to nut-locks; and it consists in a bolt having a longitudinal groove slightly inclined or beveled on curved lines at each of its ends, a nut having one or more longitudinal inner grooves, and a longitudinally curved or bent spring, said spring having one of its edges preferably sharpened or beveled and so placed in the groove of the bolt as to have its said outer sharpened edge engage one of the grooves in the nut, whereby the nut is permitted to be readily screwed on the bolt, but prevented from being unscrewed from the same, as will be hereinafter described.

Figure 1:
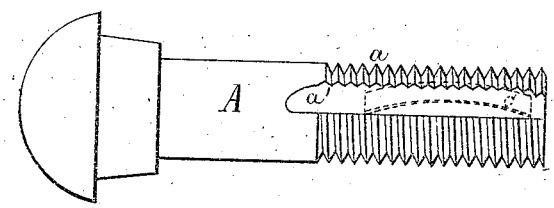
Figure 2:
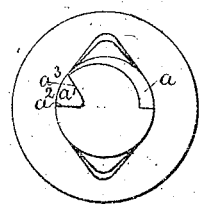
Figure 6:
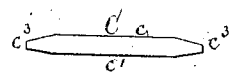
Figure 7:
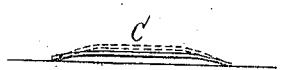
Figure 3:
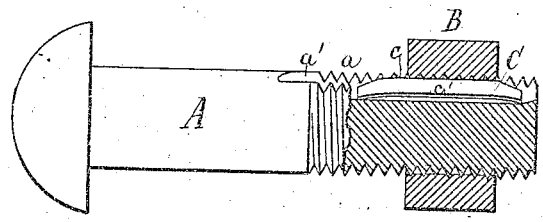
Figure 4:
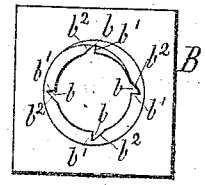
Figure 5:
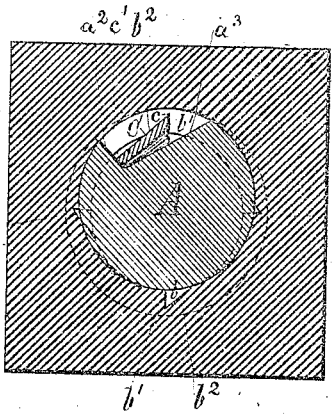
Figure 8:
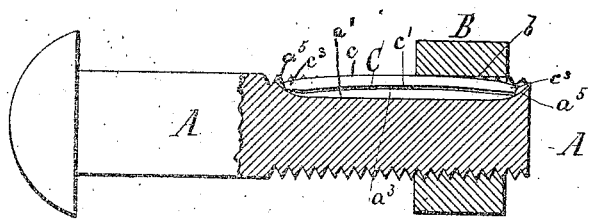
Figure 9:
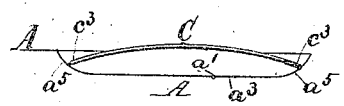
Figure 10:
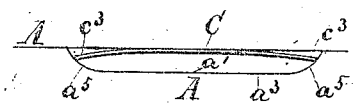

In the accompanying drawings, Figure 1 is an elevation of a bolt and spring forming part of my invention. Fig. 2 is an end view of the same. Fig. 3 is a sectional view of the end portion of said bolt and nut attached thereto, the head portion of the bolt and the locking-spring being shown in section. Fig. 4 is a face view of the nut. Fig. 5 is a transverse section of the bolt, nut, and locking-spring. Fig. 6 is an elevation of the spring, and Fig. 7 an edge view of the same. Fig. 8 is a longitudinal section through a portion of the screw-bolt and the nut, showing more plainly the bowed or bent spring and the inclined or beveled ends of the groove in the bolt. Fig. 9 is a diagram illustrating the position and shape of the spring while it is entered into one of the grooves of the nut, and Fig. 10 is a diagram illustrating the position and shape of the spring when it is out of the groove of the nut and the nut is being screwed home.

The letter A in the drawings represents a bolt such as is preferably used for coupling rails; B, a nut, and C a spring. The bolt A is provided with screw-threads $a$ and a longitudinal groove $a'$, the left side $a^2$ of which stands radial to the axis of the bolt when it is provided with a right-hand thread, and the other side $a^3$ of which groove slants toward the periphery. The nut B, which is fitted to the bolt A, is provided with one or more preferably triangular longitudinal grooves $b$, which may partly or wholly intersect the screw-threads of the same, and the right-hand side $b'$ of which preferably stands radial, while the left-hand side $b^2$ is slanting. In this construction the radial sides of the grooves $b$ in the nut and groove $a'$ in the bolt stand opposite each other when said grooves meet, and thus they form abutments for the spring C, as shown in the drawings. The spring C is introduced into the groove $a'$ of the bolt with its flat side toward the slanting side $a^3$ of the groove, and by being pushed into it is slightly compressed, as the full line views Figs. 7 and 10 show. When the nut is turned forward, the edge of the spring will slide over the threads of the nut; but when an attempt is made to unscrew the nut the spring C will expand into one of the grooves $b$ which first arrives opposite it. The outer edge $c$ of the spring abuts against the side $a^3$ of the groove $a'$. While the nut B is being turned back into the position in which the spring will finally check its motion, the back of the spring gradually approaches the side $b^2$ of the groove $b$, and when it comes fully in contact with it the motion of the nut is checked, and no blow or jolt will be able to move it farther backward.

In Fig. 8 the groove in which the spring C is fitted is shown provided with slightly-curved or upwardly-inclined end portions $a^5$ and the ends of the spring rest upon these portions, while the intermediate portion of the spring bridges or spans the other or horizontal portion of the groove. By this construction the spring is kept from falling out of the groove, and at the same time its ends have a chance to ride upward on the inclines $a^5$, while its middle portion is being depressed from the shape shown in Fig. 9 to that shown in Fig. 10, and thus the spring is enabled, very readily, to assume a form under the pressure of the forward movement of the nut, which clears it from said nut, and also is enabled to resume its locking shape (shown in Fig. 9) whenever the nut is turned back to a position which brings one or the other of the grooves $b$ in the nut in coincidence with the upper edge of said spring.

In Fig. 6 the spring is shown with tapered end portions $c^3$, which serve to accommodate the spring in its curved position to the shape of the bottom of the groove $a'$, and thus when locking the nut it can bear with the entire length of its lower edge $c'$ against the bottom portion of the groove $a'$, and thus offer a very firm resistance to any attempt to violently unscrew the nut. Instead of the tapered end formation, as described, curved end formations may be adopted with the same good result.

The radial surfaces $a^2$ $b'$, as described, are not necessarily radial in the strict sense of the word, as they may be more or less leaning, in order to more effectually more readily prevent the spring from assuming a tangential position, which would interfere with its ready operation or tend to render it inoperative.

In order to remove the nut, it must be moved forward sufficiently to ease the strain upon the spring, whereupon with a pair of pliers or other suitable tool the spring is withdrawn from the groove $a'$. This done, the nut can be unscrewed. This nut-lock may be used in various places, and when applied in an upright position the groove $a'$ may be closed to a greater extent than is represented, if found necessary, in order to prevent the spring falling out when it is in one of the grooves of the nut and not firmly held therein by friction.

What I claim as my invention is—

1. In a nut-lock, the combination of a screw-bolt A, formed with a groove $a'$, having an inclined side $a^2$ and a side $a^3$, which is inclined or made to slant to a greater extent than the side $a^2$, a nut B, formed with one or more grooves $b$, having inclined sides $b'$ and sides $b^2$, which are inclined or made to slant to a greater extent than the sides $b'$, and a bowed spring C, which bridges or spans the greater portion of the length of the groove $a'$; said spring being constructed and arranged to be depressed and thereby clear the grooves $b$ when the nut is being screwed up and to expand and enter with its bowed portion into one or the other of said grooves $b$ when the nut is slightly unscrewed, substantially as described.

2. A nut-lock comprising, in combination, a bolt having a longitudinal groove $a'$, which is inclined or beveled at its ends, as at $a^5$, a bowed spring C, bridging or spanning the groove $a'$ lengthwise and resting with its ends upon the bevels $a^5$, and a nut B, substantially as described.

In testimony whereof I hereunto affix my signature in presence of two witnesses.

THOMAS POINDEXTER POLLARD.

Witnesses:
N. W. RICHARDSON,
ROBT. R. FIELD.